Patented Apr. 22, 1930

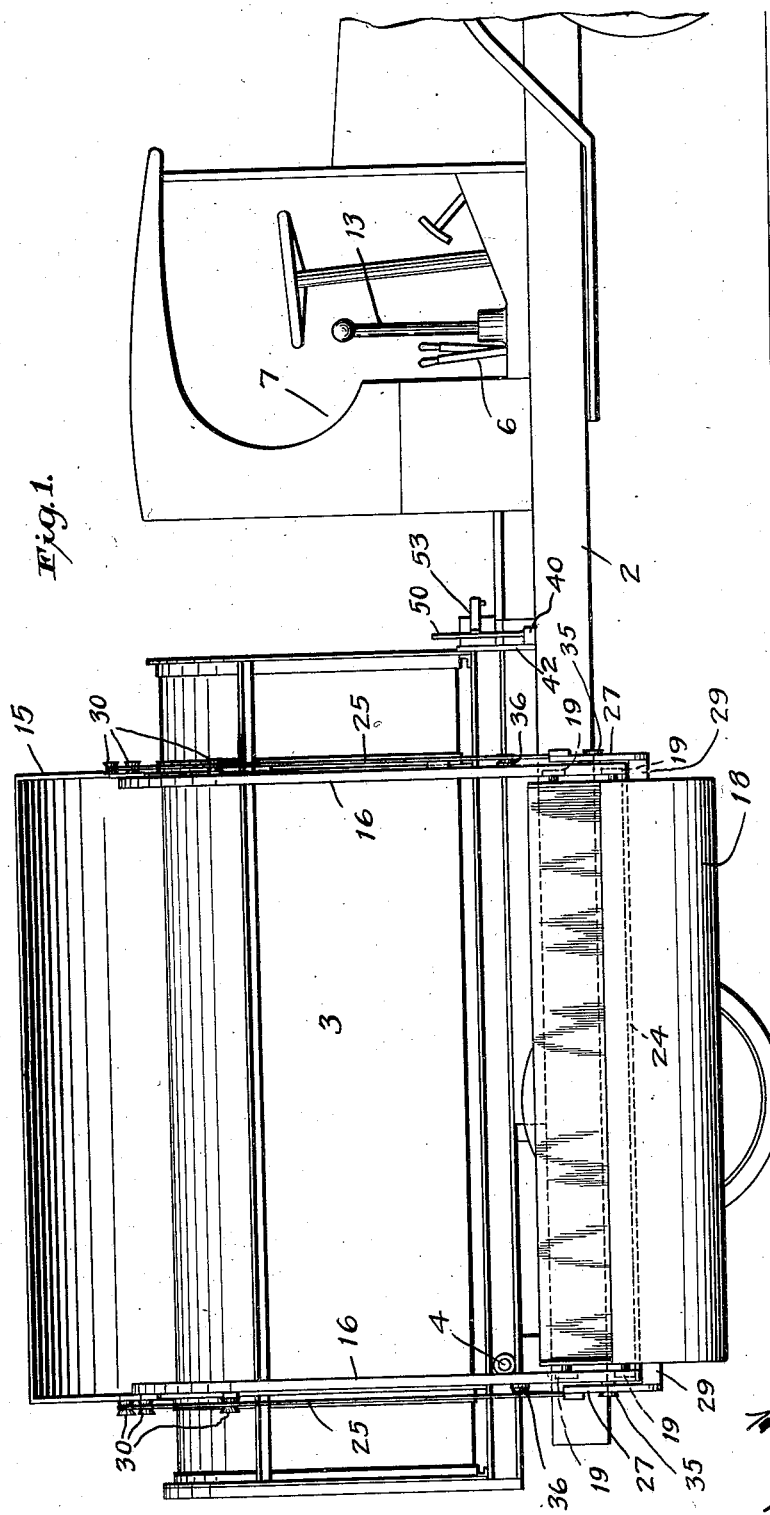

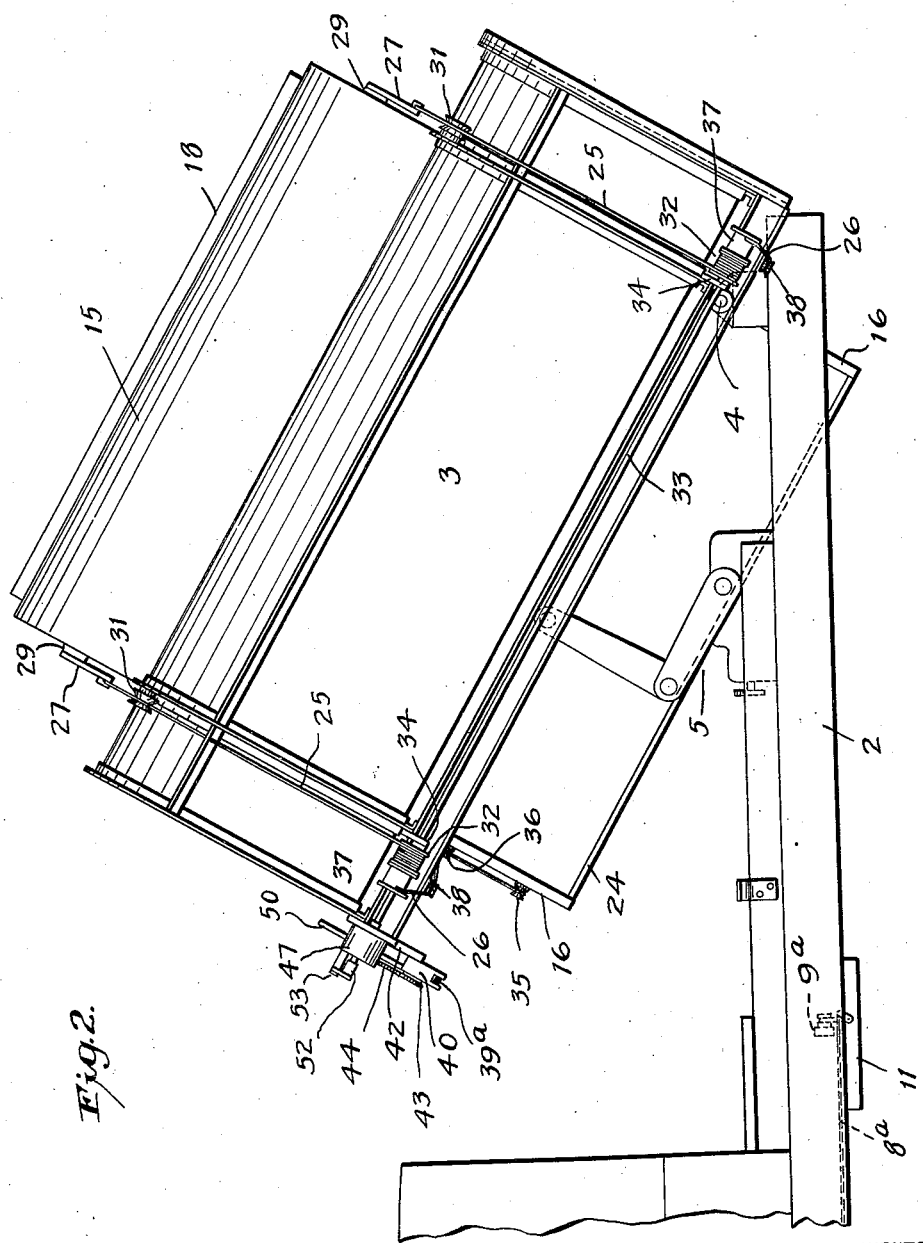

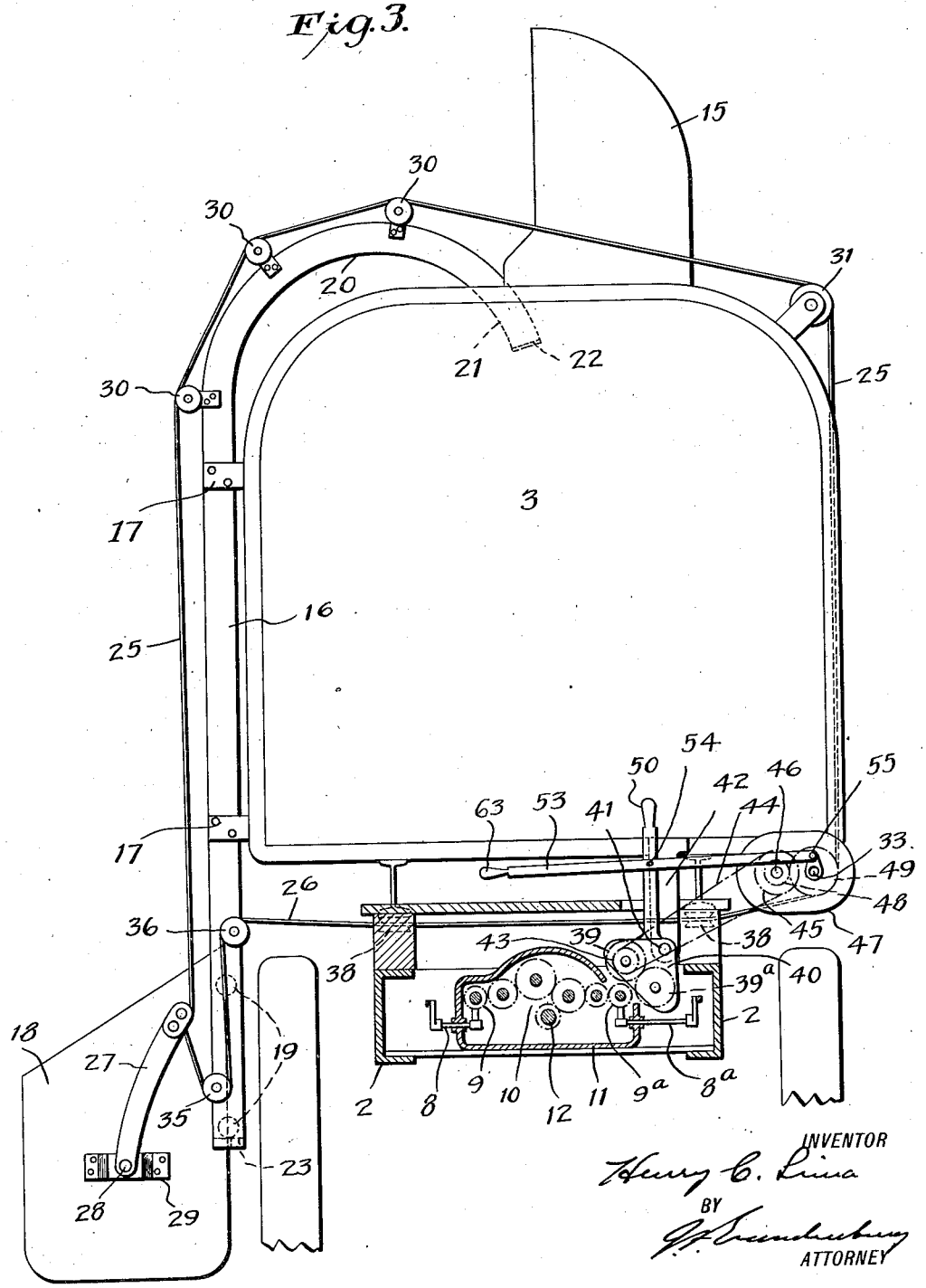

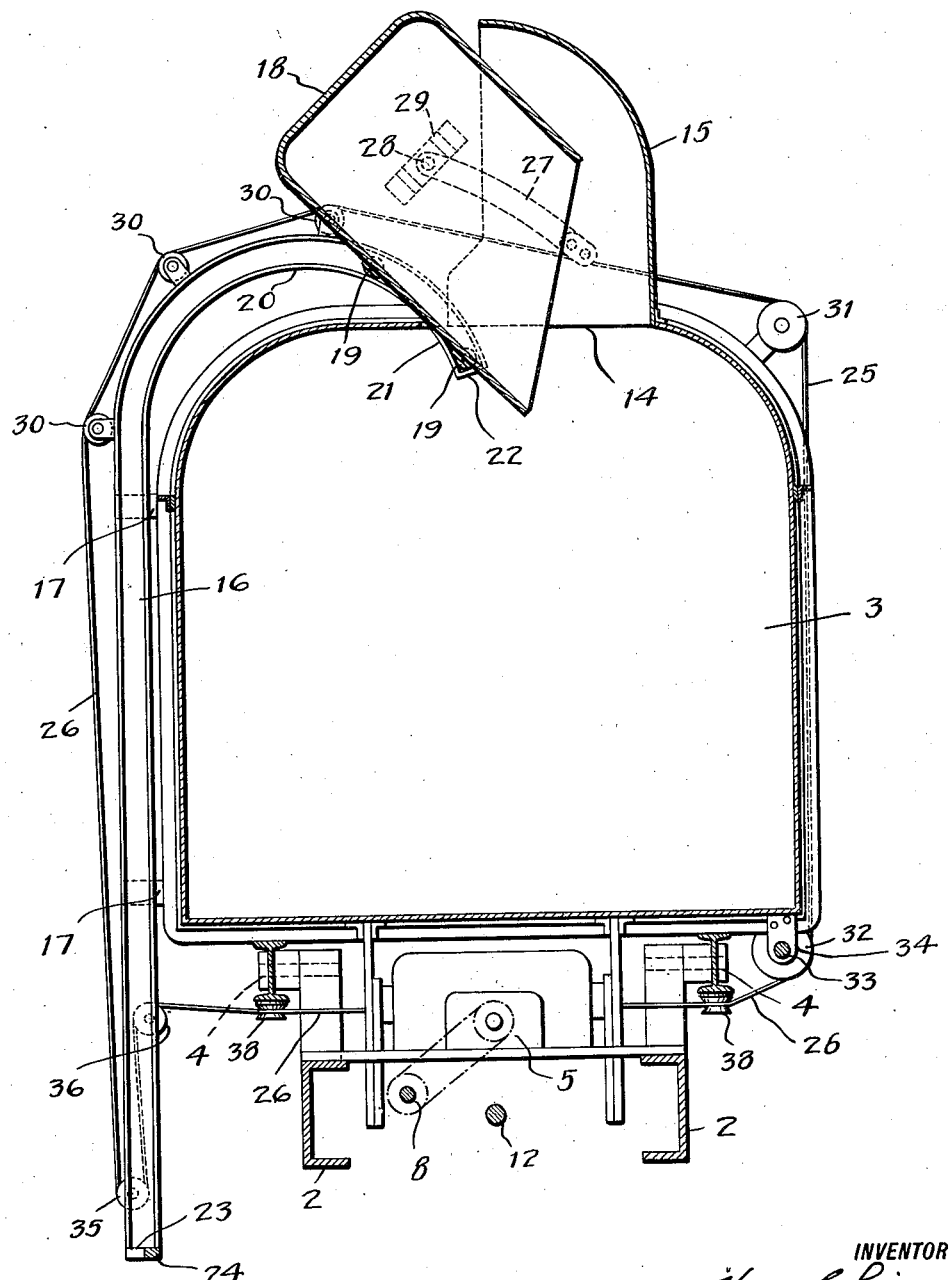

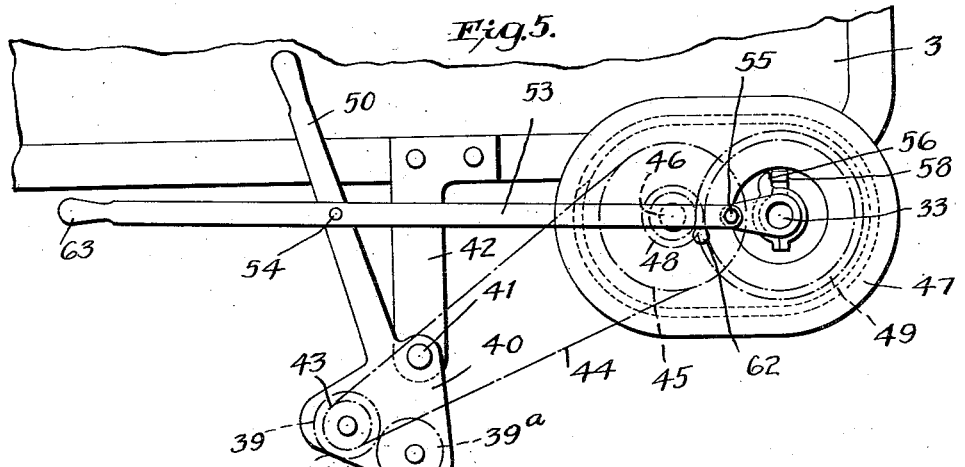
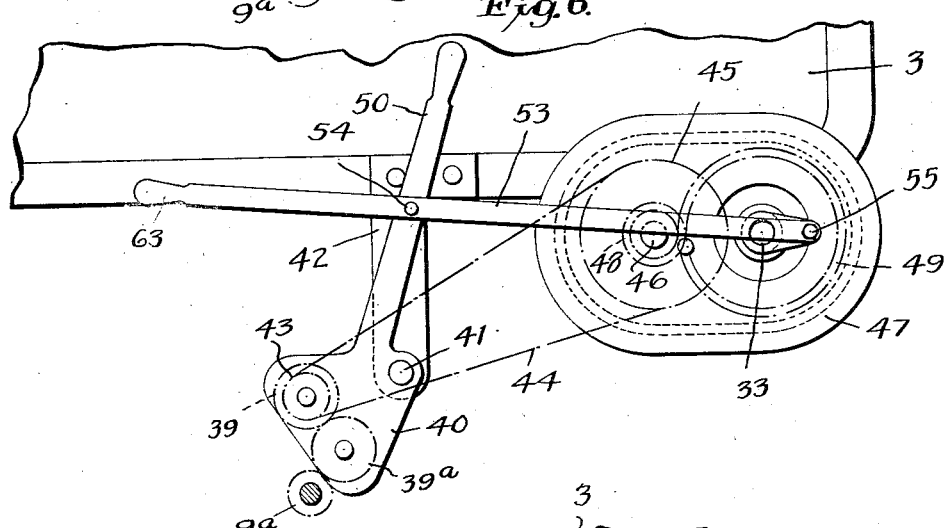
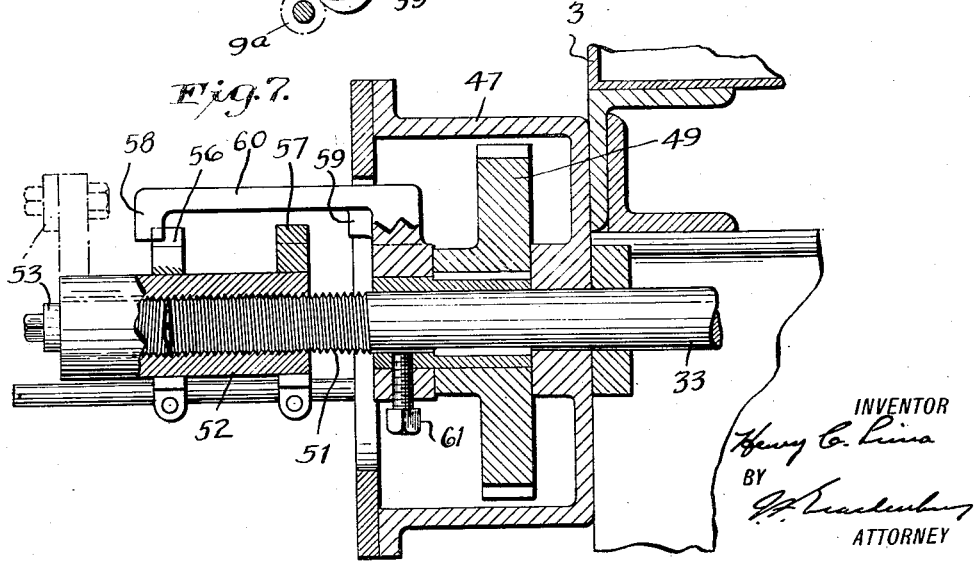

1,755,547

UNITED STATES PATENT OFFICE

HENRY C. LIMA, OF STAMFORD, CONNECTICUT, ASSIGNOR, BY MESNE ASSIGNMENTS, TO ATIA SALES CORPORATION, OF NEW YORK, N. Y., A CORPORATION OF NEW YORK

REFUSE COLLECTOR

Application filed April 11, 1925, Serial No. 22,353. Renewed December 5, 1928.

This invention relates to an improvement in an ash or garbage collector or similar traveling machine, of the kind wherein a car or bucket is hoisted up a track on the side of a receptacle body on the vehicle to elevate and dump therein the refuse which is taken up as the machine makes its rounds. The object of the invention is to provide certain novel features and combinations, making for increased efficiency, steadiness and safety of operation, and simplicity of construction, in a machine of this character.

To this end, my invention consists, primarily, in providing a novel-type of side-loading trough, in place of the usual car or bucket,—novel means for raising, emptying, and lowering the trough,—novel construction of the cargo-body, whereby the same is made unusually dust-proof and sanitary,— and novel means for dumping the load from said cargo-body at the dumping grounds.

In the accompanying drawings forming a part hereof:

Fig. 1 is a side elevation of a motor truck vehicle embodying the invention, looking at the side which carries the track, showing the trough or car in receiving position at the foot of the track;

Fig. 2 is a side elevation, looking at the opposite side of the vehicle, showing the body tilted for dumping and the trough in its upper position beneath the hood;

Fig. 3 is a vertical transverse section taken in front of the body, showing the trough at the foot of the track and the reversible gear through which the trough is operated in neutral position;

Fig. 4 is a central vertical transverse section through the body, showing the trough or car in its upper or dumping position, where it is retained by the curvature of the track;

Fig. 5 is an elevation on a larger scale of the reversible gear and drive for the trough, showing the gear in mesh for operating the car in one direction, which for illustration may be assumed to be the lowering operation;

Fig. 6 is a similar view showing the reversible gear in the other driving condition, which may be assumed to be the raising operation; and Fig. 7 is an enlarged sectional view taken in the plane of the drum shaft, showing an embodiment of means for automatically throwing off the power when the car reaches dumping position at the top and again when it reaches the foot of the track.

The drawings illustrate a motor truck vehicle embodying my invention, the chassis or frame of which is marked 2. A capacious enclosed receptacle or cargo body 3 is tiltably mounted on this chassis, so that it can be tilted from the chassis for discharging the load when the vehicle has completed a round of collections and has proceeded to a place of disposal. As illustrated in Fig. 2, the body is hinged to the chassis at the rear on a transverse axis 4, and a suitable power hoist 5 is provided for tilting the body upwardly from the chassis. This power hoist is operated through one of a pair of control levers 6 in the driver's cab 7, this lever operating through a suitable connection 8 to couple the hoist 5 with a gear wheel 9 (see Figure 3), forming one of a suitable arrangement of gear wheels 10 in the transmission case 11, which are driven from the transmission shaft 12 of the vehicle when the vehicle clutch is in engagement and the transmission gear shift lever 13 is in neutral.

The top of the body is covered over, leaving, however, a longitudinally extending receiving opening 14, which is overhung at one side by a hood 15. A track composed of two channel track members 16, attached to the tiltable body by brackets 17, extends up one side of the body from near the street level, over the top of the body, for the purpose of guiding a car or trough 18 to dump its contents through the opening 14. The trough 18 extends approximately the length of the body, and is adapted to receive the contents of a substantial number of ash cans or the like which are emptied into it when the trough is in its lowered position. The track members are correspondingly spaced apart near the front and rear ends of the body, and their inner channeled sides receive two pairs of small wheels or projections 19 on opposite ends of the trough, near its back. The upper portions of the track members 16 are formed into a recurved bend or arch 20, the end 21 of which turns downward toward, and preferably into, the side of the opening 14 in front of the hood 15.

When the trough is raised, the wheels or guide members 19 pass from the straight vertical sections of the track members 16 onto the arched curve 20, causing the trough to tilt gradually from an upright position to a horizontal position, at which dumping commences, and then causing the trough to travel down the farther slope of the curve so that the trough tilts increasingly as it advances, causing its contents to be delivered into the body in an effective manner. When the trough reaches the final dumping position seen in Fig. 4, it is retained against return to the foot of the track by reason of the fact that the wheels 19 must be raised over the curve before the trough can again be lowered.

The downturned upper ends of the track channels are preferably closed, as shown at 22, to provide a support for the trough in the position of Fig. 4, which is the position which it occupies when the vehicle travels. In this position the trough enters within the hood 15 and substantially closes the opening. Stops 23 at the ends of a cross-piece 24, connecting the lower ends of the track members, support the trough in its lowered position.

It will be readily understood that, by having a capacious trough of substantially the length of the cargo-body, and having a hooded receiving opening in the top of said body, adapted to receive the beak of the trough, as shown in Figure 4, the escape of any appreciable quantity of dust, cinders, or particles of refuse into the atmosphere, during the passage of the load from the trough into the body, will be prevented. As the load will have become evenly distributed in the interior of the trough during its ascent, it will readily distribute itself evenly in dropping into the cargo body. When the final load has thus been transferred into the cargo-body, the inverted trough will stay on top of the body and serving to make, with the hood, a complete closure of the receiving opening during transportation. The many advantages of the construction will be apparent to all persons familiar with the handling of ashes, garbage, and other refuse in transit.

The trough is raised and carried over the top curve of the track by a pair of cables 25, and is carried back over the rise for lowering by another pair of cables 26. The two sets of cables or leads are secured to arms 27, which are pivoted at 28 to brackets 29 on the ends of the trough, and the arms are offset from the trough sufficiently to pass outside of the hood 15 when the trough is drawn to its upper or dumping position. The cables 25 pass over guide pulleys 30 on the curved upper portions of the track members, thence pass outside of the ends of the hood 15 to guide pulleys 31 on the upper part of the body, beyond the hood, whence they pass downward to drums 32 on a shaft 33. This shaft is mounted rotatably in bearings 34 beneath the lower longitudinal corner portion of the tiltable body, at the side remote from the track 16, where the support and draft are advantageous, and where, also, the shaft and drums are protected by the overhang of the body. The other cables 26 pass from the arms 27 beneath guide pulleys 35 on the lower portions of the track members, thence upward and over guide pulleys 36, also on the track members, and from these pulleys they pass across beneath the body and between the same and the chassis to drums 37 on the drum shaft. Additional guide pulleys 38 mounted on vertical axes on the under part of the body guide the cables 26 in their transverse course. In the operation of the trough the cables of one set wind up on their drums while the cables of the other set unwind, and vice-versa.

The cable hoist for the car is operated from another gear wheel or pinion $9^a$, adapted to be driven from the main transmission shaft 12 through the gearing 10. When the vehicle clutch is in and the transmission gear shift lever 13 is in neutral, the pinion $9^a$ may be coupled with the drive by one of the pair of control levers 6 acting through suitable connections $8^a$. The pinion $9^a$ is positioned to be engaged when the tiltable body is down on the chassis by either one of a pair of meshing gear wheels 39, $39^a$ carried by a shifter 40, which is pivoted at 41 to a bracket 42 on the under part of the body. When the shifter is in the extreme position shown in Fig. 5, the gear wheel 39 will mesh with the pinion $9^a$, while in the other extreme position of Fig. 6 it is the wheel $39^a$ which meshes with the pinion. In the neutral or mid position seen in Fig. 3, neither of the wheels 39, $39^a$ meshes with the pinion, and consequently the trough hoist will not be operated in either direction.

A sprocket wheel pinion 43 which is united with the gear wheel 39 carries a sprocket chain 44, which passes around a sprocket wheel 45 on a shaft 46 in a casing 47 secured to the body. A toothed pinion 48 on the shaft 46 meshes a gear wheel 49 fixed to the drum shaft 33. When the handle 50 of the reversible gear is moved to the position seen in Fig. 6, the drum shaft will be driven in one direction, which may be the direction to wind up on the cables 25 and pay out the cables 26, thus causing the car to rise from the lower end of the track over the top of the body and dump. When the parts are in the position of Fig. 5, the drums will be rotated in the reverse direction, so that, for example, the cables 26 will be wound up on their drums to withdraw the car from the dumping position, up over the curve of the track, while the cables 25 are paid out, lowering the trough after the latter passes the high point.

Means are also provided on the body for automatically throwing off the power or interrupting the drive when the trough reaches its two extreme positions, thus preventing accidents through breaking of a cable. The form of such means may be varied. In the particular construction illustrated, the automatic throw-off is operated from the rotatable shaft 33, on the forward end of which is a screw 51. On this screw is a traversing member 52, in the nature of a nut, which is connected with the lever 50 by a link bar 53 connected at 54 to the said lever and eccentrically pivoted at 55 to the member 52. The member 52 is moved slowly in or out lengthwise of the shaft 33, depending upon the direction of rotation of this shaft, and is provided with a pair of longitudinally spaced tappets 56, 57, adapted to encounter the lugs 58, 59 of a whirling arm 60, the hub of which is fixed by a screw 61 to the rotary shaft 33. The tappets 56, 57 are clamped to the member 52, so as to be relatively adjustable, and are so set that when the car comes to the dumping position at the top of the body one of the tappets, for instance the tappet 57, comes into the path of the lug 59 of the whirling member 60, which thereupon gives the member 52 a partial rotation, sufficient to throw the reversible gear to a neutral position. Conversely, when the trough reaches the lower end of the track, the other tappet 56 encounters the lug 58, which throws the member 52 in the opposite direction, thereby again bringing the reversible gear into neutral. A stationary pin 62 may be provided for supporting the link bar 53 in the two extreme positions of the shifter, and the centers may be so arranged that the linkage will lock the reversible gear against unintended separation of the pinion 9ª and the wheel 39, or the pinion 9 and the wheel 39ª, as the case may be. The bar 53 may be extended beyond its connection with the lever 50, and may be provided with a handle 63 for unlocking the linkage should occasion arise.

While the preferred form of the invention has been described in detail, it will be understood that various changes may be made without departing from my invention.

For example:—The outstanding features of my refuse collector are the adaptation, as above described and shown, of an improved loading device, spoken of as a trough, to an improved cargo body, as a receiver, thus "making for increased efficiency and simplicity of construction",—and the equipment of the vehicle with improved mechanism for operating the trough and cargo-body, thus "making for increased steadiness and safety of operation". Changes in the adaptation or in the specific operating mechanism may be made without departing from my invention so long as the main features and results are obtained.

What I claim as new is:

1. A refuse collector comprising a chassis, a cargo body mounted on said chassis having a curved top, and a receiving opening running substantially the full length of the body, a protecting hood on the curved top overhanging the opening and adapted to co-operate with a loading trough in its raised position so as to prevent escape of discharging material, a guide at each end of the opening having a straight portion along the side of the vehicle and a curved portion along the curved top co-operating with the protecting hood,—a material carrying trough having a material receiving opening substantially the length of the body, guided along said guides and having a width so that when raised it substantially fills said protecting hood, and means for raising and lowering said trough.

2. A traveling refuse collector or like machine, comprising a vehicle having a receptacle body, a track extending up one side of the body, a wheeled car movable up and down the track to dump into the body, a shaft on the opposite side of the body bearing drums, one set of cables extending from the car over the body and another set of cables extending from the car under the body to the drums.

3. A traveling refuse collector or like machine, comprising a vehicle having a receptacle body, a track extending up one side of the body, a wheeled car movable up and down the track to dump into the body, a longitudinal drum shaft beneath the opposite lower corner portion of the body, one set of cables extending from the car over the body and thence downward to the drum shaft and another set of cables extending from the car between the body and the chassis to the drum shaft, and means for driving said shaft in opposite directions from a source of power on the chassis.

4. In a traveling refuse collector or like machine, a body having a covered top containing a dumping opening and having a hood overhanging said opening, a track extending up one side of the body, a wheeled car adapted to be hoisted up said track to dump through said opening, arms pivoted to the opposite ends of the car to pass outside of said hood, and operating cables secured to said arms.

HENRY C. LIMA.